US008303742B2

(12) United States Patent
Brusarosco et al.

(10) Patent No.: US 8,303,742 B2
(45) Date of Patent: *Nov. 6, 2012

(54) TYRE COMPRISING AN ELECTRONIC UNIT AND A METHOD OF INSTALLING SAID ELECTRONIC UNIT INTO SAID TYRE

(75) Inventors: Massimo Brusarosco, Milan (IT); Anna Paola Fioravanti, Milan (IT); Federico Mancosu, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 958 days.

This patent is subject to a terminal disclaimer.

(21) Appl. No.: 12/084,059

(22) PCT Filed: Oct. 27, 2006

(86) PCT No.: PCT/EP2006/010364
§ 371 (c)(1),
(2), (4) Date: Dec. 30, 2008

(87) PCT Pub. No.: WO2007/048621
PCT Pub. Date: May 3, 2007

(65) Prior Publication Data
US 2009/0101257 A1 Apr. 23, 2009

(30) Foreign Application Priority Data
Oct. 28, 2005 (WO) ............... PCT/IB2005/003235

(51) Int. Cl.
*B60C 23/00* (2006.01)
(52) U.S. Cl. ....... 156/110.1; 156/64; 156/123; 156/378; 156/379; 152/152.1; 152/415; 73/146; 73/146.3; 73/146.5

(58) Field of Classification Search ............. 156/64, 156/110.1, 123, 378, 379; 152/152.1, 415; 73/146, 146.3, 146.5
See application file for complete search history.

(56) References Cited

U.S. PATENT DOCUMENTS

| 5,090,237 | A | 2/1992 | Schrumpf et al. | |
|---|---|---|---|---|
| 6,809,700 | B2 * | 10/2004 | Benedict et al. | 343/872 |
| 7,908,918 | B2 * | 3/2011 | Brusarosco et al. | 73/146.5 |
| 2002/0174925 | A1 * | 11/2002 | Wilson et al. | 152/415 |
| 2004/0112489 | A1 | 6/2004 | Imbert | |
| 2009/0115591 | A1 * | 5/2009 | Mancosu et al. | 340/447 |

FOREIGN PATENT DOCUMENTS

| DE | 102 55 138 A1 | 6/2004 |
|---|---|---|
| WO | WO 99/41093 | 8/1999 |
| WO | WO 2004/005054 A1 | 1/2004 |

* cited by examiner

*Primary Examiner* — Katarzyna Wyrozebski Lee
*Assistant Examiner* — Joshel Rivera
(74) *Attorney, Agent, or Firm* — Finnegan, Henderson, Farabow, Garrett & Dunner, L.L.P.

(57) ABSTRACT

A tyre having a radially internal surface of substantially toroidal conformation, includes: a housing mounted on the internal surface of the tyre and an electronic unit at least partially housed in the housing, the housing including at least two portions, each having a cavity in contact with a respective portion of the electronic unit and housing the same, each portion of the housing being mounted on the internal surface of the tyre, and a fastening element applied to the portions of the housing to maintain a constraint between such portions and the electronic unit. A method of installing the electronic unit into a tyre.

25 Claims, 4 Drawing Sheets

TYRE COMPRISING AN ELECTRONIC UNIT AND A METHOD OF INSTALLING SAID ELECTRONIC UNIT INTO SAID TYRE

CROSS REFERENCE TO RELATED APPLICATION

This application is a national phase application based on PCT/EP2006/010364, filed Oct. 27, 2006, and claims the priority of PCT/IB2005/003235, filed Oct. 28, 2005, the content of both of which is incorporated herein by reference.

BACKGROUND OF THE INVENTION

1. Field of the Invention

The present invention relates to a tyre comprising an electronic unit. Said invention also relates to a method of installing said electronic unit into said tyre.

2. Description of the Related Art

On some types of vehicles the necessity is felt to monitor the operating conditions of the tyres and to possibly keep traces of the evolution in time of some characteristic operating parameters. For instance, when vehicles using tyres of the run flat type are concerned, i.e. tyres capable of ensuring some kilometers of distance covered even in case of tyre deflation, provided some characteristic parameters are complied with such as maximum speed, temperature and maximum distance to be traveled over, the above requirement is particularly felt for safe use of said type of tyres.

The characteristic parameters that are generally considered may be identification code, temperature, pressure, distance run by the tyre, as well as parameters originating from mathematical calculations that can be carried out within the tyre or on board the vehicle.

To this aim, within the tyre an electronic unit can be mounted, said electronic unit being suitable for obtaining at least one of the above characteristic parameters. Preferably, the electronic unit can comprise at least one sensor, possibly associated with a control unit (such as a microprocessor) and/or a data storage unit and with an antenna; said antenna has the task of enabling radio-frequency signal exchange with the devices mounted on board the vehicle.

In addition, the antenna can allow the system present within the tyre to be suitably powered without using independent powering units (e.g. batteries within the tyre). Therefore, the apparatus mounted on board the vehicle are provided to generate an electromagnetic field with which the antenna placed in the tyre can be coupled by induction, and by virtue of which the necessary energy for operation of the sensor and the possible control unit is supplied by the antenna itself.

U.S. Pat. No. 5,090,237 proposes a pressure sensor for determining air pressure of a motor vehicle tyre; the sensor has a housing for extending into a recess formed in a rim wall of the tyre, and an annular flange located on the housing and supporting a spring against a side of the rim wall. The spring provides for clamping an outer flange portion of the pressure sensor housing against another side of the rim wall.

SUMMARY OF THE INVENTION

Within this technological field, the Applicant has felt the necessity:
to improve the manufacture simplicity of the electronic unit housing;
to ensure an important mechanical uncoupling of the electronic unit from stresses generated on the unit itself, by the tyre during running;
to enable operation also under conditions of lack of pressure within the tyre;
to enable a simple application of said electronic unit to an already manufactured tyre, without affecting the operational features of the tyre itself (e.g. adhesion techniques used in the tyre repairing can be employed).

In addition, the Applicant has also felt the necessity to obtain a housing for the electronic unit which allows integration into the tyre during the assembling on the rim.

The Applicant has found that by associating an electronic unit to the tyre by means of a housing having two portions, each portion being mounted on the internal surface of the tyre and having at least one cavity in which the electronic unit is partly inserted, a considerable manufacturing simplification can be achieved, and improvements can be obtained both in terms of reliability of engagement between the electronic unit and the tyre, and in terms of practical operation of the electronic unit itself.

In particular, according to a first aspect, the invention relates to a tyre for vehicle wheels, having a radially internal surface of substantially toroidal conformation, comprising:
a housing, mounted on the internal surface of said tyre;
an electronic unit, at least partially housed in said housing;
wherein said housing comprises:
at least two portions, each having a cavity in contact with a respective portion of said electronic unit and housing the same, each portion of said housing being mounted on the internal surface of said tyre;
a fastening element, applied to the portions of said housing to maintain a constraint between said portions and said electronic unit.

According to a different aspect, the present invention relates to a method of installing an electronic unit into a tyre, said method comprising the steps of:
providing a tyre having a radially internal surface of substantially toroidal conformation;
providing a housing, having at least two portions, each having a cavity for housing a respective portion of said electronic unit;
inserting each of said portions of the electronic unit into the cavity of the respective portion of said housing;
applying a fastening element to the portions of said housing to maintain a constraint between said portions and said electronic unit;
mounting each portion of said housing on the internal surface of said tyre.

In a preferential embodiment the two portions defining the housing are separated portions.

In particular the two portions defining the housing can be substantially identical to each other.

In this manner an increased manufacturing simplification is achieved, since both portions can be realized by means of a single mould.

In another preferential embodiment, when the electronic unit is inserted in the housing (i.e. in the two portions), at least a part of the electronic unit is not covered by such portions, so that sensing and/or transmitting-receiving devices included in the electronic unit can work properly, not being shielded by a layer of the elastomeric material of which the two portions are made.

BRIEF DESCRIPTION OF THE DRAWINGS

Further features and advantages will become more apparent from the detailed description of a preferred, but not exclusive, embodiment of a tyre comprising an electronic unit and of a method of installing said electronic unit into said tyre, in accordance with the present invention. This description will be set out hereinafter with reference to the accompanying drawings, given by way of non-limiting example, in which.

DETAILED DESCRIPTION OF THE INVENTION

Figure 1:
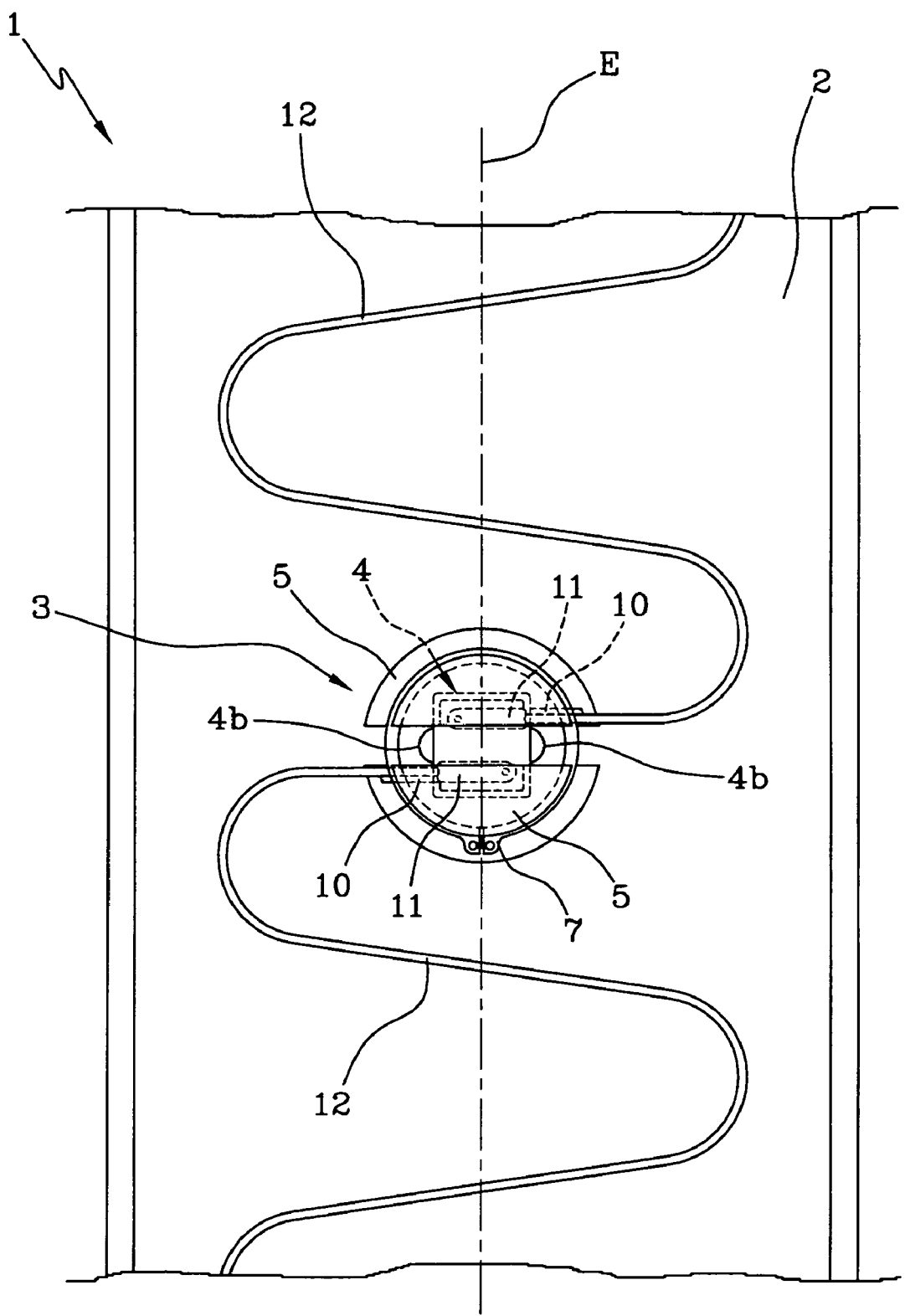
FIG. 1 is a diagrammatic plant view of a portion of the internal surface of a tyre in accordance with the invention, on which an electronic unit is mounted.

With reference to the drawings, a tyre for vehicle wheels in accordance with the present invention has been generally denoted at 1.

Tyre 1 can be mounted on any type of vehicle such as motor vehicles or motorcycles; more particularly tyre 1 is set to be used on vehicles that are provided on board with the necessary electronics for co-operating and interacting with the devices housed in the tyre itself and described in the following.

Tyre 1 has a radially internal surface 2 of substantially toroidal conformation; this internal surface 2 can be defined by a layer of elastomeric material that is substantially airtight and is usually referred to as "liner".

Mounted on the radially internal surface 2 is an electronic unit 4 set to detect operating parameters relating to tyre 1 and the operating conditions of the tyre itself.

The electronic unit 4 may comprise one or more sensors to detect said operating parameters which for example, can be the tyre temperature, inner pressure and/or distance covered, possibly calculated in co-operation with the devices located on board.

The electronic unit 4 can be associated with a microprocessor connected to said sensors to manage operation thereof, and with a storage unit to contain the data detected by the sensors.

Preferably stored in the electronic unit 4 (in the storage unit if present) are tyre identification data, to be able to unequivocally identify the tyre during processing and evaluation of the operating parameters mentioned above.

For installation of the electronic unit 4 within tyre 1, a housing 3 is provided, which is mounted on the internal surface 2 of said tyre 1.

The housing 3 has at least two portions 5, each having a cavity 6 in contact with a respective portion 4a of the electronic unit 4 and housing the same.

Each portion 5 of the housing 3 is mounted on the internal surface 2 of the tyre 1.

The electronic unit 4 is at least partially housed in the housing 3, so that the same electronic unit 4 is engaged to the internal surface 2 of the tyre 1.

Advantageously, the ratio between the height of the housing 3 and the height of the electronic unit 4, both measured in a radial direction (i.e. a direction substantially perpendicular to the internal surface 2 of the tyre 1), is larger than 1.2, and preferably larger or equal than 1.4.

Preferably, the portions 5 of the housing 3 are made of an elastomeric material, selected, for instance, from synthetic diene rubbers, natural rubber, ethylene-propylene rubber, ethylene-propylene-diene rubber and the like.

More in particular, said elastomeric material has a hardness comprised between about 30° Shore A and about 60° Shore A (at the temperature of 23° C.), and preferably between about 40° Shore A and about 50° Shore A (at the temperature of 23° C.).

Preferably, each portion 5 of the housing 3 has a substantially semi-cylindrical shape; consequently, the housing 3 has a substantially cylindrical shape.

The height of the housing 3, measured in a radial direction (i.e. a direction perpendicular to the internal surface 2 of the tyre 1) can be comprised between about 3 mm and about 15 mm, and preferably between about 5 mm and about 10 mm.

In a preferred embodiment (FIGS. 1-4), the portions 5 are separate from each other.

In such a case, the lower surface of the portions 5 can be directly in contact with the internal surface 2 of the tyre 1.

Figure 5:
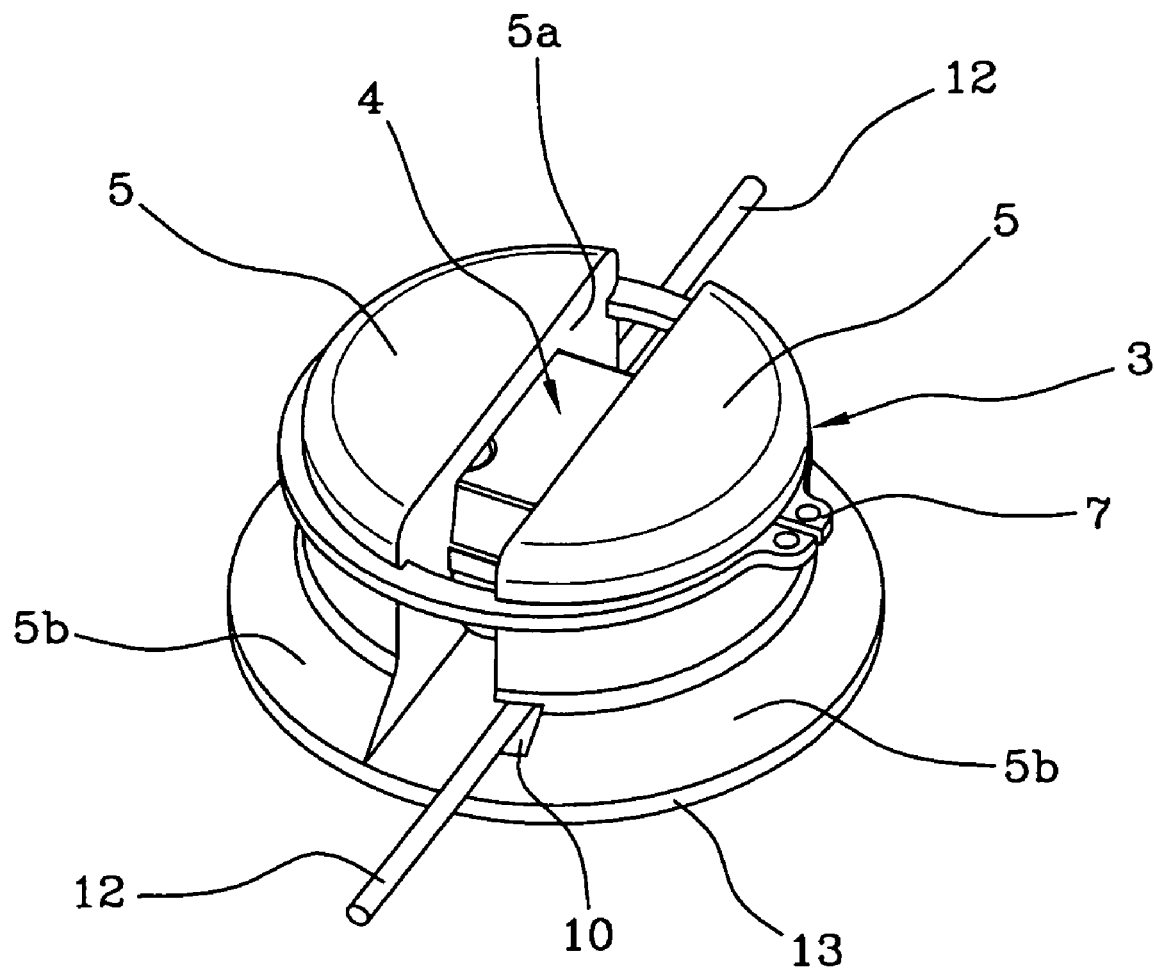
FIG. 5 is a perspective view of an alternative embodiment of the assembly of FIG. 3.

In another preferred embodiment (FIG. 5), the housing 3 further comprises a connection layer 13, with which the lower surfaces of the portions 5 are connected.

The portions 5 can be mounted on said connection layer 13; alternatively, the portions 5 can be integrally made with said connection layer 13.

Preferably the connection layer 13 is made of an elastomeric material; the latter can be selected, for instance, from synthetic diene rubbers, natural rubber, ethylene-propylene rubber, ethylene-propylene-diene rubber and the like.

In particular, the connection layer 13 can be made of the same material as the portions 5.

In case the connection layer 13 is provided, the portions 5 of the housing 3 are not directly in contact with the internal surface 2 of the tyre 1, the same connection layer 13 being interposed between the portions 5 and the internal surface 2.

It is to be noted that in both embodiments (separate portions and portions connected through the connection layer 13) a satisfactory mechanical uncoupling between the portions 5 is obtained, and in no case the deformations undergone by the tyre 1 during running are transmitted in a significant manner to the electronic unit 4.

In order to maintain a constraint between the electronic unit 4 and the portions 5 of the housing 3, a fastening element 7 is applied to the portions 5.

Preferably, the fastening element 7 is ring-shape; in particular, the fastening element 7 can be made of a metallic material (e.g. a "seger ring") or an elastomeric material (e.g. an "o-ring").

Preferably, the fastening element 7 is engaged with a side wall 8 of each portion 5 of the housing 3; in particular, each portion 5 has a groove 9 on its side wall 8 in which the fastening element 7 is housed.

It is to be noted that in the description and in the following claims for "diameter", when not referred to a circumference, it is to be intended the maximum overall dimension measured in a plane substantially parallel to the contact surface between the internal surface 2 of the tyre 1 and the housing 3.

Preferably, the ratio between the internal diameter of the groove 9 and the length of the electronic unit 4 measured along its longitudinal extension is comprised between about 1.05 and about 1.3; in such a way, the housing has a sufficiently thick structure to resist to the stresses generated during running of the tyre 1.

In particular, the minimum thickness of the material interposed between the electronic unit 4 and the fastening element 7 is at least about 0.5 mm, and preferably at least about 1 mm.

In order to optimize the engagement between the housing 3 and the electronic unit 4, the cavities 6 of portions 5 are conform in shape with the portions 4a of electronic unit housed therein, so that each portion 4a is substantially in contact with the internal surface of the respective cavity 6.

In the preferred embodiment, the electronic unit 4 has a symmetric conformation with respect to a plane substantially perpendicular to the main longitudinal extension of the same electronic unit 4; in particular, the electronic unit 4 has a substantially prismatic shape and, preferably, is substantially in the shape of a parallelepiped.

The electronic unit 4 can have a symmetric tapered conformation, converging from a central area to an upper base, and from the central area to a lower base. In other words, the electronic unit 4 can have a symmetric double-frustoconical conformation, diverging towards its axial ends.

Figure 2:
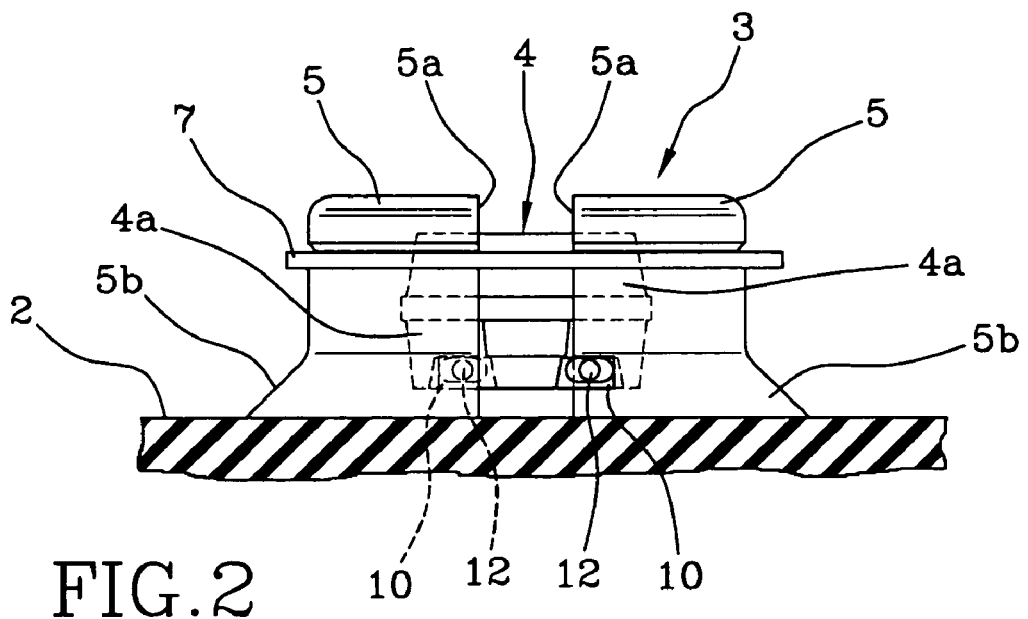
FIG. 2 is a side view of a detail of the tyre of FIG. 1.
Figure 3:
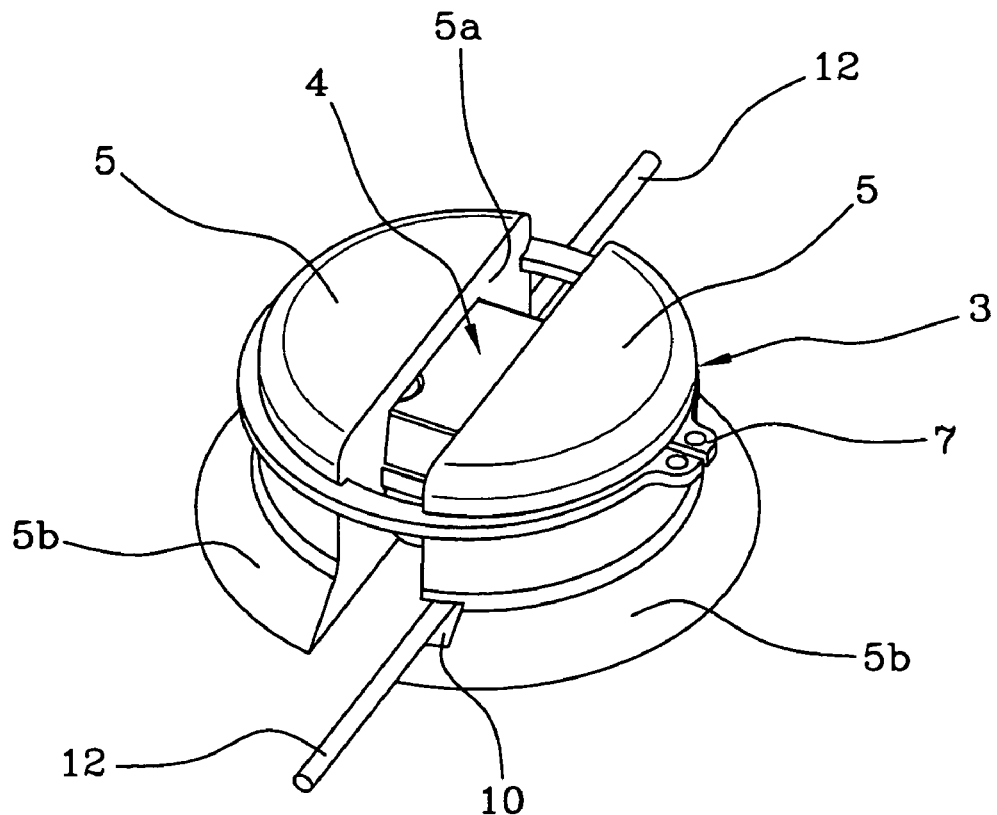
FIG. 3 is a perspective view of a detail of the tyre of FIG. 1.
Figure 4:
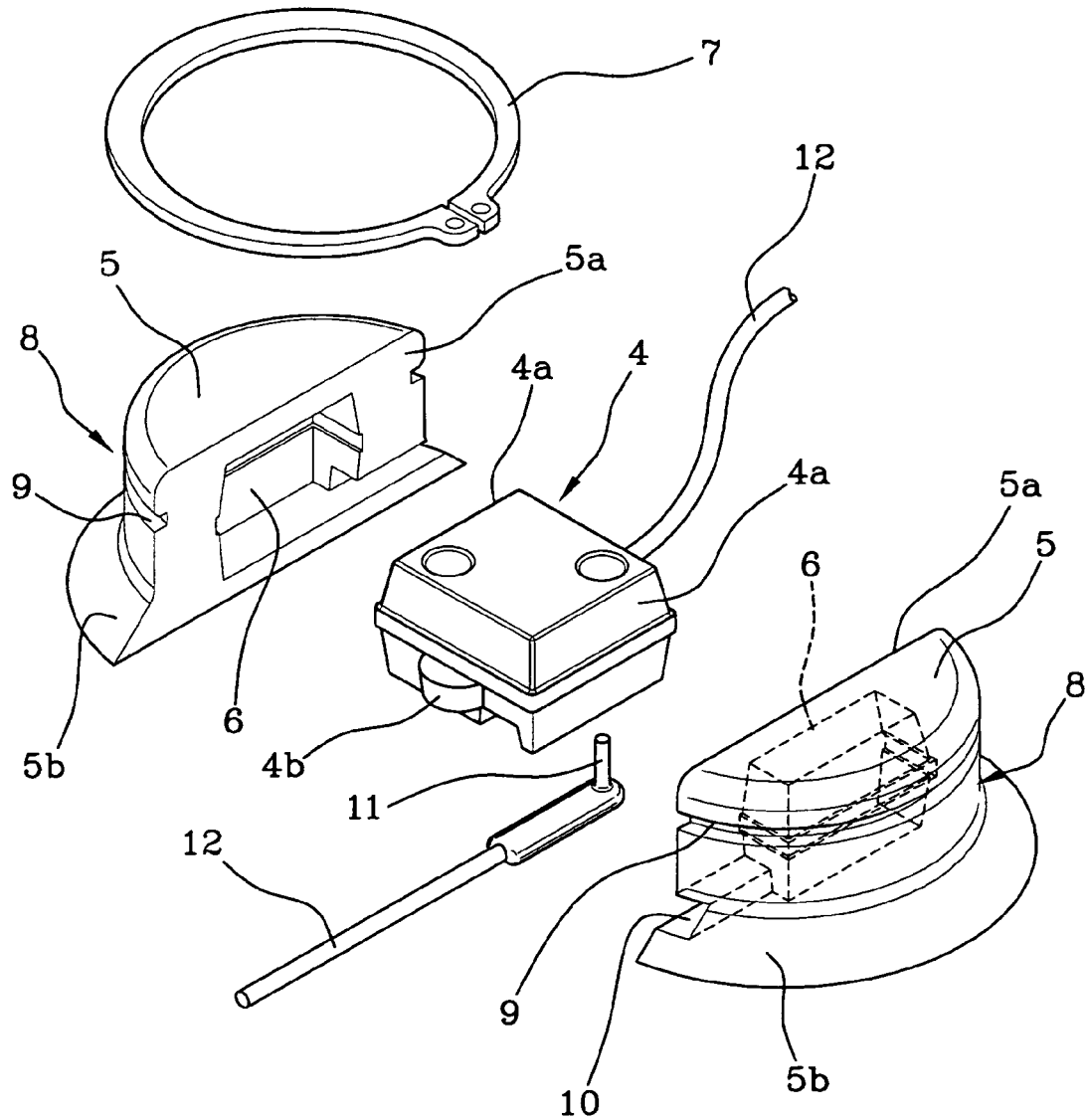
FIG. 4 is an exploded perspective view of the assembly of FIG. 3

The central area can also have a perimetral protrusion, as clearly shown in FIGS. 2 and 4.

Due to the symmetric conformation of the electronic unit 4, the portions 5 of the housing 3 can be substantially identical to each other; such feature clearly increases the manufacturing simplification of the housing, since both portions 5 can be realized by means of a single mould.

Advantageously, the portions 5 of the housing 3 are not in contact with each other, so that a significant mechanical uncoupling of the electronic unit 4 from stresses generated on the same electronic unit 4 by the tyre 1 during running is achieved.

Further, by maintaining a preset distance between the two portions 5, a proper working of the electronic unit 4 is allowed, since sensors and/or transmitting-receiving devices provided therein are not shielded by the elastomeric material of which the portions 5 are made.

In more detail, each portion 5 of the housing 3 has a front surface 5a; when the housing 3 is assembled with the electronic unit 4, the front surfaces 5a of the portions 5 face each other.

Preferably, the front surfaces 5a are plane and substantially parallel to each other.

In the preferred embodiment, the front surfaces 5a are arranged according to a direction which is transverse and preferably perpendicular to the equatorial plane E of the tyre 1.

The preset distance between the portions 5 can be comprised between about 20% and about 40%, and preferably between about 25% and about 35%, of the length of the electronic unit 4 measured in the same direction as said preset distance.

Such direction can be the direction of the main longitudinal extension of the electronic unit 4.

The distance between the portions 5 is preferably comprised between 4 mm and 10 mm, and in particular can be substantially equal to about 6 mm.

Advantageously, the main longitudinal extension of the electronic unit 4 is substantially parallel to, and in particular lies on, the equatorial plane E of the tyre 1.

Accordingly, the open region defined between the front surfaces 5a of the portions 5 of the housing 3 has a main longitudinal extension substantially perpendicular to the equatorial plane E of the tyre 1.

Each portion 5 of the housing 3 can have a tapered end 5b in contact with the internal surface 2 of the tyre 1 and diverging towards said internal surface 2; in particular, the angle α defined between the base surface of the portion 5 and the external inclined side wall of the tapered end 5b is comprised between 30° and 55°, and preferably between about 40° and about 50°.

The height of the tapered portion 5b, measured in a radial direction (i.e. a direction perpendicular to the internal surface 2 of the tyre 1) can be comprised between about 2 mm and about 5 mm, and preferably between about 3.5 mm and about 4.5 mm.

The maximum diameter of the tapered end 5b is preferably comprised between 30 mm and 40 mm, and in particular can be comprised between about 33 mm and about 38 mm.

In the preferred embodiment, the layer of elastomeric material defined between the lower base (i.e. the base closer to the inner surface 2 of the tyre 1) of the electronic unit 4 and the inner surface 2 of the tyre 1 can be at least 2 mm thick, in case the maximum diagonal of the electronic unit 4, measured in a plane substantially parallel to the inner surface 2 of the tyre 1, is about 22 mm long.

Should said maximum diagonal change its length, the thickness of said layer would increase/decrease proportionally.

Further, the thickness of the layer of elastomeric material defined between the lower base (i.e. the base closer to the internal surface 2 of the tyre 1) of the electronic unit 4 and the inner surface 2 of the tyre 1 can be substantially equal to the thickness of the elastomeric material defined between the upper base (i.e. the base farther from the internal surface 2 of the tyre 1) of the electronic unit 4 and the upper surface (i.e. the surface farther from the internal surface 2 of the tyre 1) of the housing 3.

It is to be noted that the diameter of the non-tapered and non-grooved portion of the housing 3 is larger than the average diameter of the ring defining the fastening element 7, thereby ensuring that the same fastening element 7 will not lose its correct position within the groove 9 during running of the tyre 1.

Such diameter can be comprised between 20 mm and 40 mm, and preferably between about 25 mm and about 35 mm.

Preferably, the fastening element 7 is made in such a way that its internal diameter can be elastically enlarged by a factor comprised between 20% and 40%, in particular comprised between about 25% and about 35%, in case an elastomeric ring is employed.

If the fastening element 7 comprises a metallic ring, for example a "seger ring", its internal diameter is preferably equal to or smaller than the internal diameter of the groove 9.

Preferably, the electronic unit 4 is arranged to talk to an electronic device positioned on board the vehicle. To enable communication between the electronic unit 4 and electronic device on board, an antenna 12 is provided to be operatively associated with the electronic unit 4. The antenna 12 can be comprised in the same electronic unit 4 or is preferably mounted on the radially internal surface 2 of tyre 1.

In addition to the above, the antenna 12 can be also utilized to power the electronic unit 4 and the devices associated therewith, so as to avoid use of independent powering units within the tyre 1.

To this aim, the antenna 12 has a coil-shaped conformation (or more exactly it is of the "closed" type as defined in the following), so as to be coupled with an electromagnetic field generated by the device present on board the vehicle and to absorb the energy necessary to feed the electronic unit 4.

In a preferred embodiment, the antenna 12 is defined by an elongated, thread-like body.

Data exchange between the electronic unit 4 and said electronic device takes place through transmission and reception of radio-frequency signals (RF signals) the frequency of which can be included between about 100 kHz and about 50 MHz, and preferably can correspond to about 125 kHz. In particular, this frequency range can be used if feeding of the electronic unit 4 is wished to take place through the antenna 12 itself that in this case would have a configuration of the "closed" type. If on the contrary the antenna is wished to be used for data transmission/reception, also frequencies included between about 300 MHz and about 2.5 GHz can be employed, in which case antennas of a configuration of the "open" type are utilized.

In the present context, an antenna with a configuration of the "open" type means an antenna the configuration of which defines an electrically open circuit. For instance, the antenna body can have one or more ends electrically connected to the detecting unit and one or more "free" ends.

By the expression an antenna with a configuration of the "closed" type it is intended an antenna the conformation of which defines an electrically closed circuit, in which case the antenna body has two ends that are both electrically connected to said detecting unit. Co-operation between the on board devices, antenna 12 and electronic unit 4 therefore constitutes, when requested, a detecting system enabling the electronic unit 4 to also operate without the presence of batteries or similar powering units mounted within the tyre 1.

For mutual engagement between the electronic unit 4 and the antenna 12, each portion 5 of the housing 3 has an internal recess 10 for containing an end portion 11 of the antenna 12.

Preferably, the internal recess 10 extends from the respective cavity 6 towards the outside, thereby allowing the end portion 11 of the antenna 12 to properly reach the electrical connection of the electronic unit 4.

In more detail, the antenna 12 has at least two "L"-shaped end portions, each having a first part adapted to be inserted in a respective seat of the electronic unit 4, and a second part substantially perpendicular to the first part; the second part is substantially aligned with the rest of the antenna 12.

As shown in FIGS. 1-5, the engagement areas between the electronic unit 4 and the antenna 12 are contained in said cavities 6, so that a reliable mutual constraint is obtained.

The engagement areas between the electronic unit 4 and the antenna 12 are defined at the lower base (i.e. the base closer to the liner) of the electronic unit 4.

The electronic unit 4 can be provided with auxiliary cavities, within which the second part of the end portions 11 of the antenna 12 are housed.

In order to help maintaining the electronic unit 4 in a proper position after assembling with portions 5 of the housing 3, the same electronic unit 4 is provided with one and preferably a couple of wings 4b, extending between the portions 5 of the housing 3 externally with respect to the cavities 6 thereof.

The wings 4b can also be employed for housing additional electronic components of the electronic unit 4.

Preferably, the wings 4b are substantially symmetrical with respect to the main longitudinal extension of the electronic unit 4.

In particular, the wings 4b extend in a direction perpendicular to the main longitudinal extension of the electronic unit 4.

In a preferential embodiment, the maximum width of the wings 4b is defined by the distance between the portions 5 of the housing 3 (in particular, the distance between the front surfaces 5a), so that each wing 4b is in contact with both portions 5 and prevents the electronic unit 4 from losing its proper position within the housing 3.

When the electronic unit 4 is to be installed within the tyre 1, the electronic unit 4 is firstly connected to the end portions 11 of the antenna 12.

Such connection can be obtained by inserting the first part of each "L"-shaped end portion 11 in the respective seat defined in the electronic unit 4.

Then, each portion 4a of the electronic unit 4 is inserted into the cavity 6 of the respective portion 5 of the housing 3.

Advantageously, the outer surface of the electronic unit 4 is in contact with the internal surface of the cavities 6.

As stated above, a preset distance is maintained between the portions 5 of the housing 3 (i.e. between the mutually facing front surfaces 5a of said portions 5).

Then, the fastening element 7 is applied to the portions 5 of the housing 3, preferably placing the fastening element 7 in the groove 9 of the aforementioned side walls 8.

As disclosed above, the portions 5 can be separate portions.

Alternatively, the portions 5 can be connected through the connection layer 13; in such a case, the method according to the invention can include a step of mounting the portions 5 on the connection layer 13.

It is to be noted that the step of mounting the portions 5 on the connection layer 13 is not carried out in case the portions 5 are made integrally with the connection layer 13.

Then, the assembly defined by the housing 3, electronic unit 4 and fastening element 7 is mounted on the internal surface 2 of the tyre 1.

In particular, the portions 5 of the housing 3 are mounted on said internal surface 2, preferably by means of layer of a proper adhesive material or by means of a vulcanization process.

If the above vulcanization process is employed, the electronic unit 4 could be damaged for the high temperature values. In this case, a dummy instead of the electronic unit 4 is inserted into the cavities 6. Then, when the assembly (defined by the housing 3, the dummy and the fastening element 7) is mounted on the internal surface 2, the fastening element 7 is removed, the dummy is extracted, and the electronic unit 4 is inserted into the cavities 6. Finally, the fastening element 7 is applied to the portions 5 of the housing 3.

In case the portions 5 are separate portions and an adhesive material is employed for connection with the internal surface 2 of the tyre 1, the adhesive material is directly applied between the portions 5 and the internal surface 2, whereas if the connection layer 13 is provided, such adhesive material is preferably applied between the connection layer 13 and the internal surface 2.

When mounted on the internal surface of the tyre 1, the portion of antenna 12 engaged with a preset portion 5 of the housing 3 can extend in the same side of such preset portion 5 with respect to the front surface 5a of said preset portion 5, as shown in FIG. 1.

In an alternative embodiment, the portion of antenna 12 engaged with a preset portion 5 of the housing 3 can extend in the opposite side of such preset portion 5 with respect to the front surface 5a of said preset portion 5.

The invention claimed is:

1. A tyre having a radially internal surface of substantially toroidal conformation, comprising:
    a housing mounted on the internal surface of said tyre; and
    an electronic unit at least partially housed in said housing, said housing comprising:
        at least two portions, each having a cavity in contact with a respective portion of said electronic unit and housing the same, each portion of said housing being mounted, by a respective base surface thereof, on the internal surface of said tyre; and
        a fastening element applied to the portions of said housing to maintain a constraint between said portions and said electronic unit.

2. The tyre as claimed in claim 1, wherein the cavity of each portion of said housing conforms in shape to the portion of said electronic unit housed therein.

3. The tyre as claimed in claim 1, wherein said electronic unit has a symmetric conformation with respect to a plane substantially perpendicular to the main longitudinal extension of said electronic unit.

4. The tyre as claimed in claim 1, wherein said electronic unit has a prismatic shape or is in the shape of a parallelepiped.

5. The tyre as claimed in claim 1, wherein the portions of said housing are substantially identical to each other.

6. The tyre as claimed in claim 1, wherein the portions of said housing are not in contact with each other.

7. The tyre as claimed in claim 6, wherein each portion of said housing has a front surface facing the front surface of an other portion of said housing, said front surfaces being spaced out by a preset distance.

8. The tyre as claimed in claim 7, wherein said front surfaces are substantially parallel to each other.

9. The tyre as claimed in claim 8, wherein said front surfaces are arranged according to a direction which is transverse or is transverse and perpendicular to an equatorial plane of said tyre.

10. The tyre as claimed in claim 7, wherein said preset distance is about 20% and about 40%, of the length of the electronic unit measured in a same direction as said preset distance.

11. The tyre as claimed in claim 10, wherein said preset distance is about 25% to about 35%.

12. The tyre as claimed in claim 1, wherein the portions of said housing are made of an elastomeric material.

13. The tyre as claimed in claim 12, wherein said elastomeric material has a hardness about 30° Shore A to about 60° Shore A at a temperature of 23° C.

14. The tyre as claimed in claim 1, wherein said fastening element is engaged with a side wall of the portions of said housing.

15. The tyre as claimed in claim 14, wherein each portion of said housing has a groove on the side wall thereof for engagement with said fastening element.

16. The tyre as claimed in claim 1, wherein said fastening element is ring-shaped.

17. The tyre as claimed in claim 1, wherein each portion of said housing has an internal recess for containing an end portion of an antenna connected to said electronic unit.

18. The tyre as claimed in claim 1, wherein the main longitudinal extension of said electronic unit is substantially parallel to, or is substantially parallel to and lies on an equatorial plane, of said tyre.

19. The tyre as claimed in claim 1, wherein said electronic unit comprises at least one wing extending between the portions of said housing and externally with respect to the cavities thereof.

20. The tyre as claimed in claim 1, wherein each of the portions of said housing has a substantially semi-cylindrical shape.

21. The tyre as claimed in claim 20, wherein each portion of said housing has a tapered end engaged with the internal surface of said tyre and diverging toward said internal surface.

22. A tyre as claimed in claim 21, wherein the angle defined between the base surface of each portion of the housing and the external inclined side wall of the respective tapered end is about 30° to about 55°.

23. The tyre as claimed in claim 15, wherein a ratio between an internal diameter of said groove and a length of said electronic unit measured along said longitudinal extension is about 1.05 to about 1.3.

24. The tyre as claimed in claim 1, wherein a ratio between a height of said housing and a height of said electronic unit, both measured in a radial direction, is greater than 1.2.

25. The tyre as claimed in claim 1, wherein the portions of the housing are separate portions.

* * * * *